Aug. 25, 1959  J. KLINE ET AL  2,901,707
COHERENT-PULSED OSCILLATOR
Filed Oct. 19, 1956  4 Sheets-Sheet 1

Jack Kline
Martin R. Richmond
INVENTORS

SIMPLIFIED STARTING PROCESS IN A SYNCHRONIZED OSCILLATOR

Jack Kline
Martin R. Richmond
INVENTORS

Jack Kline
Martin R. Richmond
INVENTORS

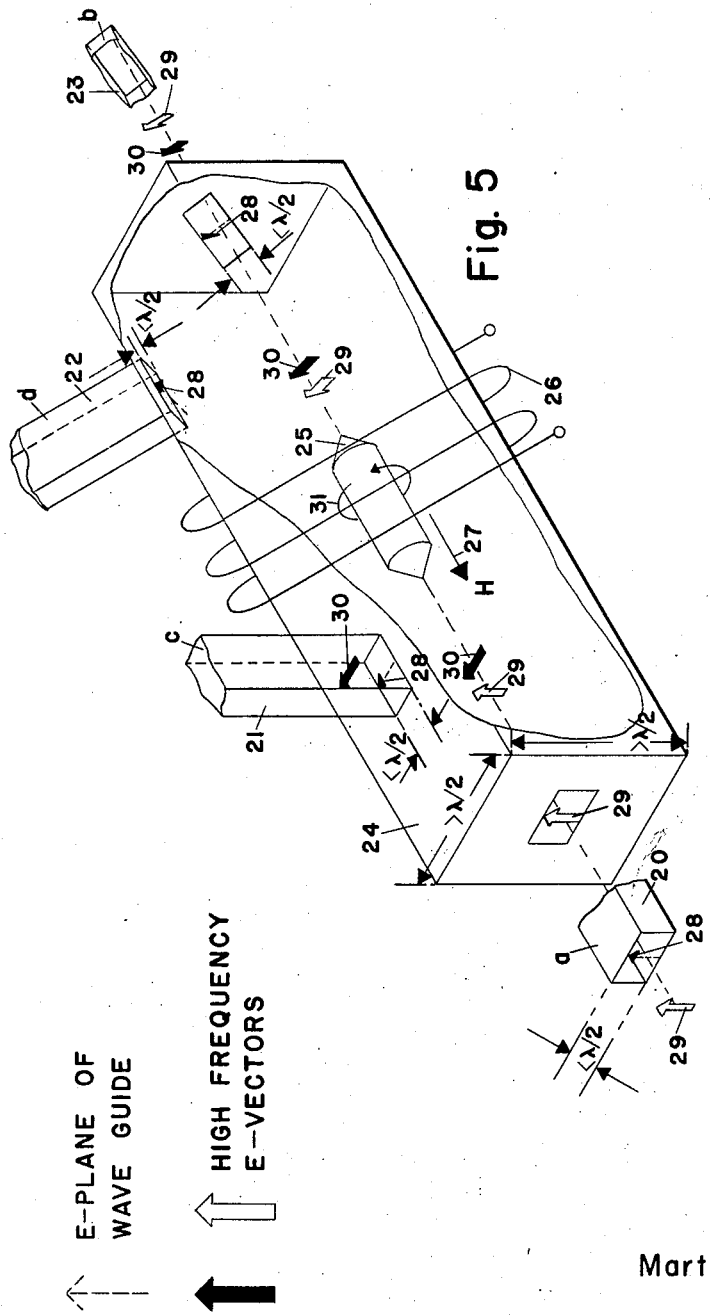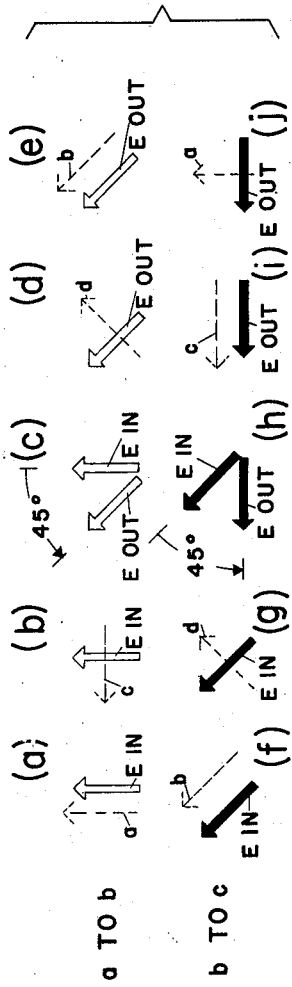
Jack Kline
Martin R. Richmond
INVENTORS

United States Patent Office 2,901,707
Patented Aug. 25, 1959

2,901,707

COHERENT-PULSED OSCILLATOR

Jack Kline, Concord, Mass., and Martin R. Richmond, Nashua, N.H., assignors to Sanders Associates, Inc., Nashua, N.H., a corporation of Delaware Application October 19, 1956, Serial No. 617,116

7 Claims. (Cl. 331—173)

The present invention relates to radar systems. More particularly, the present invention relates to pulse radar systems designed for the detection of moving targets.

The recent rise in the application of pulse-Doppler techniques in radar is responsible for sharpening the need for phase coherence between successive pulses of high frequency energy in a given wave train. The term "phase coherence" as used herein implies a predetermined phase relation between the successive high-frequency-signal bursts recurring for a given time interval (familiarly termed pulse width) at a given repetition rate (familiarly termed PRF or pulse repetition frequency). In conventional pulse modulation systems, a random phase relation occurs between the high frequency energies of successive pulses, primarily because there is no need in such systems for phase coherence. In the practice of pulse-Doppler techniques, however, the detection of Doppler frequency shifts in the high frequency signals, resulting from relative motion between the target and the radar, is accomplished by comparing transmitted and received pulses to obtain a difference or Doppler frequency signal. The frequency of such a signal is typically of the order of 200–40,000 cycles for a carrier frequency operating at 10 kilomegacycles. It is, consequently, not possible to obtain an accurate measure of the Doppler frequency unless the phase relation between the high frequency energies in successive pulses is predetermined, that is, unless one obtains pulse-to-pulse coherence.

It is therefore an object of the invention to provide an improved coherent-pulsed oscillator providing pulse-to-pulse coherence.

It is a further object of the invention to provide an improved pulsed oscillator exhibiting a high degree of pulse-to-pulse phase coherence.

It is a still further object of the present invention to provide a coherent-pulsed oscillator having a high degree of isolation between its circuits.

Yet another object of the invention is to provide an improved coherent-pulsed oscillator requiring relatively little power to establish phase coherence.

In accordance with the invention there is provided a coherent-pulsed oscillator. The oscillator comprises oscillator means to generate a high frequency signal. Pulse generating means are coupled to the oscillator means to cause it to oscillate during predetermined time intervals recurring in a predetermined pattern. Synchronizing means provide a synchronizing signal. A load means is provided. Directional coupling means so couple the synchronizing means to the oscillator means and the oscillator means to the load means as to cause substantially all of the energy in the high frequency signal to be translated to the load means and substantially all of the energy in the synchronizing signal to be translated to the oscillator means, thereby establishing pulse-to-pulse phase coherence between pulses of energy generated by the oscillator means.

For a better understanding of the present invention, together with other and further objects thereof, reference is made to the following description taken in connection with the accompanying drawings and its scope will be pointed out in the appended claims.

In the drawings:

Fig. 5 is a partially schematic, fragmentary, isometric view of a directional coupler utilized in the embodiments of Figs. 1 and 4; and Fig. 6 is a series of vector diagrams illustrating an aspect of the directional coupler in Fig. 5.

Figure 1:
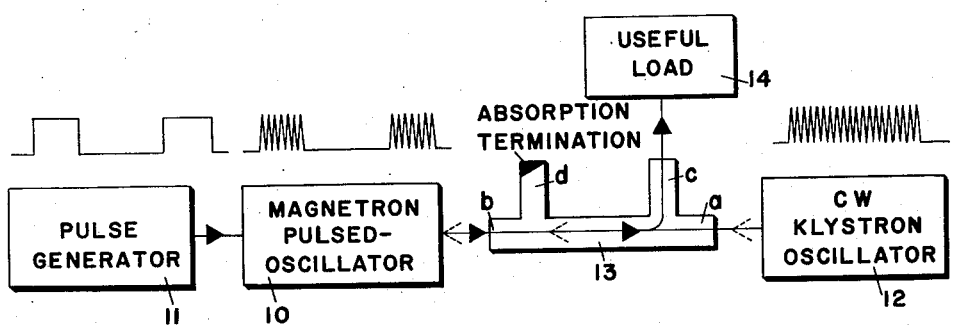
Fig. 1 is a schematic block diagram of a coherent-pulsed oscillator embodying the invention.

Description and operation of the coherent-pulsed oscillator in Fig. 1

Referring now to the drawings and with particular reference to Fig. 1, there is here presented a coherent-pulsed oscillator embodying the present invention. Oscillator means, specifically a magnetron oscillator 10, include a resonant cavity to generate a high frequency signal and is coupled to a pulse generating means, here a pulse generator 11, for periodic excitation. A continuous wave oscillator 12, such as a klystron, is coupled through a non-reciprocal directional coupler 13 to the oscillator 10 to provide a synchronizing means therefor. The oscillator 10 is also coupled through the coupler 13 to a useful load 14, such as an antenna. The coupler employed herein may be, for example, a ferrite device of the type illustrated and described by B. D. H. Tellegen, Philips Research Reports, 3, pp. 81–101 (1948); 3, pp. 321–337 (1948); 4, pp. 31–37 (1949); 4, pp. 366–369 (1949) and in an article by C. L. Hogan entitled "The Ferromagnetic Faraday Effect at Microwave Frequencies and Its Applications: The Microwave Gyrator," Bell System Technical Journal, vol. XXXI, Number 1, pp. 1–31, January 1952. The units 10–12, inclusive may be of conventional, well-known construction.

The magnetron oscillator 10 operates at a frequency of, for example, 10 kilomegacycles and at a peak power output of, for example, 10,000 watts. The pulse generator 11 operates at a PRF of, for example, 5,000 pulses per second, each pulse having a width of 1 microsecond. The output pulses of the generator 11 are, for example, 7,000 volts in amplitude. The output of the magnetron oscillator 10 flows in the manner indicated by the heavy black arrows through the branch b of the gyrator 13 and is translated out the branch c to a useful load. Since the gyrator is a non-reciprocal, circulatory device, substantially none of the energy from the oscillator 10 is translated to the klystron oscillator 12. More particularly, it has been found that the energy from the oscillator 10 in the branch c is at least 20–50 db above the energy to be found in the branch a.

Phase coherence is obtained in the embodiment shown by virtue of the continuous wave energy from the oscillator 12 transmitted along the path indicated by the dashed arrows to the magnetron oscillator 10. This energy provides a synchronizing signal to maintain the magnetron oscillating at a low power level between pulses. The power level is chosen to be below that necessary to sustain self-oscillation. Without the presence of a synchronizing signal, the starting point or phase of the energy generated by the oscillator 10 on excitation by the pulse from the generator 11 would be random, and there would, of course, be no pulse-to-pulse coherence. As noted above, the latter type of operation is typically true of prior art radar pulsed oscillators. Here, however, when a high power pulse is applied from the generator 11 to the magnetron oscillator 10, a high power signal is generated in which the starting phase is determined by the energy from the synchronizing means or klystron oscillator 12.

As described in the above-referenced articles and in greater detail below, the gyrator is a circulatory device in which energy entering the branch $a$ is translated to branch $b$ and reflected by branches $c$ and $d$. Energy introduced at the branch $b$ is translated to the branch $c$ and reflected by branches $a$ and $d$. The device utilizes the so-called "Microwave Faraday Effect" in which the plane of polarization of incident energy, having a given propagation axis, is rotated a predetermined number of degrees. This effect is realized by passing the energy through a transparent ferromagnetic material, such as ferrite, through which there is impressed an axial magnetic field. In devices similar to the above, the magnetic field is impressed transversely relative the axis of the guide.

Theory of operation

In an oscillator operating in a synchronized condition under, for example, the influence of a buffered, externally applied, sinusoidal signal, the difference in phase between the signal and the generated oscillations is approximately:

$$(1) \qquad \phi = \sin^{-1} \frac{Q_E(\omega_1 - \omega')}{|\rho|\omega_0}$$

where $\phi$ is the phase difference between the locking signal and the oscillator signal; $\rho$ is the reflection factor and is related to the reflection coefficient; $\omega'$ is the oscillator frequency in the absence of the external signal (also used as "instantaneous frequency" during the buildup transient); $\omega_1$ is the frequency of the locking signal (assumed to be the same as that of the oscillator when synchronized); $\omega_0$ is the natural frequency of the oscillator circuit; and $Q_E$ is a coupling factor. From this equation we can determine the maximum conditions beyond which synchronization cannot occur. The maximum possible value of $|\omega - \omega'|$ occurs when $|\sin \phi| = 1$. For this limiting condition:

$$(2) \qquad (\omega_1 - \omega') = \pm \frac{|\rho|\omega_0}{Q_E}$$

In a typical X-band magnetron, assume $\omega_0 = 2\pi$ (9000) megaradians per second, and $Q_E = 300$, the injected signal cannot be of lower power than $-10$ db of the oscillator power output ($|\rho| = \frac{1}{3}$) for frequency locking over a range of $\pm 10$ megacycles. This results in a signal which is frequency locked to the injected signal through most of the pulse. However, the high synchronizing power required for this frequency locking is prohibitive for normal operations.

Utilizing the coherent-pulsed oscillator embodied in Fig. 1, however, far less synchronizing power is required. In this embodiment pulse-to-pulse phase coherence is accomplished by a synchronizing signal on the order of 30–40 db below the minimum value indicated by Equation 2. It is noteworthy that the oscillator signal, although phase coherent, is not frequency locked to the injected signal. This fact has been experimentally established by noting that the effect of load frequency pulling is the same with or without the injected signal. Furthermore, if the synchronizing signal is changed in frequency, the frequency of the magnetron oscillator 10 is not changed as it would be in a locked oscillator. On the other hand, Fournier's component frequencies, which appear as discrete frequencies for pulse-to-pulse phase-coherent signals, are so related to the synchronizing signal that its frequency is always identical with a Fournier component. This implies that the Fournier component frequencies follow the synchronizing signal as represented, for example, in a conventional frequency analysis. Thus, the synchronizing klystron oscillator 12 is truly a reference oscillator, the lines in a frequency spectrum analysis being spaced in frequency about the reference frequency provided by the oscillator 12. This result is further supported experimentally by the fact that variations in PRF are observed only at frequencies removed from the reference frequency and are relatively independent of the magnetron center frequency.

Figures 2A, 2B:
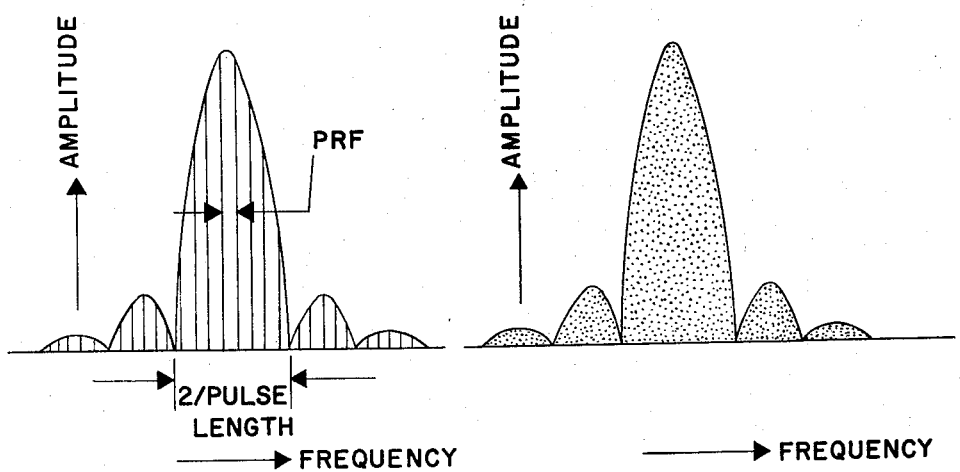
Figs. 2a and 2b are diagrams of frequency spectra illustrating an aspect of the operation of the invention.

Figs. 2a and 2b are diagrams of a frequency analysis of the radio frequency output provided respectively by a coherent, pulsed-oscillator and a non-coherent, pulsed-oscillator. It will be apparent from Fig. 2a that the frequency components provided by a coherent, pulsed-oscillator are clearly defined as opposed to the spectrum obtained from a non-coherent, pulsed-oscillator as illustrated in Fig. 2b. As shown in Fig. 2b, the random phasing of the energy in each pulse provides a diffuse frequency spectrum in which the individual frequency components are substantially undefined. It will be apparent that RF energy of the character illustrated in Fig. 2b is not particularly useful in detecting small shifts of frequency for the purpose of extracting Doppler frequency information. In Fig. 2a, where the phase of the signal from pulse-to-pulse is coherent, the spectrum is characterized by lines which are separated in frequency by the PRF. In Fig. 2b the relative phases of the pulse-to-pulse signals are entirely unrelated, thus accounting for a spectrum of radio frequency pulses characterized by a continuum of frequencies within an amplitude envelope. This latter spectrum is characteristic of the pulsed oscillator wherein the high frequency signal during each pulse builds up from random noise.

Figure 3:
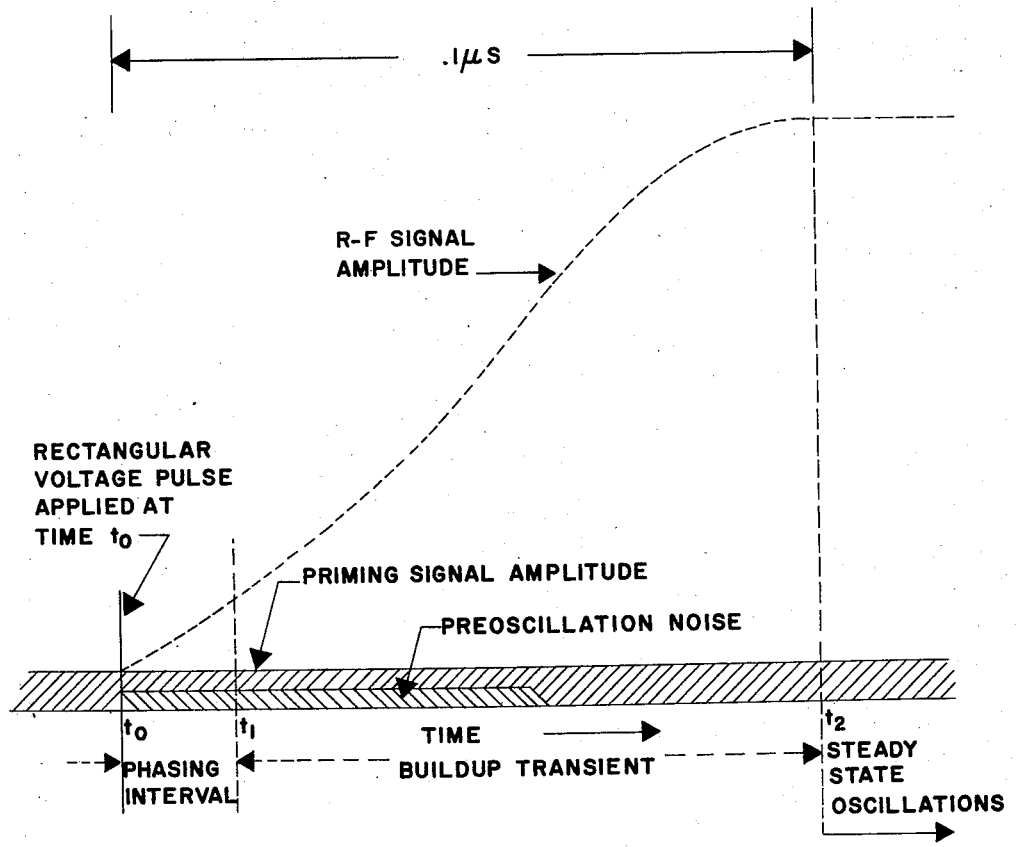
Fig. 3 is a graph of signal amplitude versus time illustrating another aspect of the operation of the invention.

Referring now to Fig. 3 the phasing process provided by the coherent-pulsed oscillator embodied in Fig. 1 is illustrated. The generation of a high power signal by the oscillator 10 may be divided for purposes of analysis into three conditions, the phasing interval, the buildup transient interval and the steady-state condition. If the chart of Fig. 3 is taken to be illustrative of a 1 micro-second pulse width, the time interval occupied by the chart is on the order of a .1 microsecond. The phasing interval is quite short relative to the rise time of a pulse of high frequency energy which occurs upon the application of an applied high voltage pulse from the generator 11. Assuming that the buildup of oscillation in the oscillator 10 can be approximated by a continuous succession of steady-state conditions, Equation 2 can be applied to determine the instantaneous phase and frequency locking conditions. The phasing interval is the period during the buildup of oscillation when:

$$(3) \qquad |\rho| > \frac{Q_E}{\omega_0}(\omega_1 - \omega')$$

For weak synchronizing signals, this equation defines a condition which exists only during the first several milli-microseconds after the pulse is applied, wherein the pulse is applied at $t_0$ and the inequality (3) is satisfied arbitrarily until a later time, $t_1$. As shown in the diagram, during this interval the synchronizing signal is sufficiently powerful to override the pre-oscillation noise and the self-sustaining oscillations to phase lock the oscillator. Oscillations build up during this interval from an initial condition of noise plus priming signal. It will be apparent that without the synchronizing signal the oscillations would develop from noise and characteristically are randomly phased. In the steady-state condition which begins at approximately $t_2$, the oscillator is free running, uninfluenced by the synchronizing signal. In the time interval between the two conditions described above, i.e., between the phase interval and the steady-state condition, the time from $t_1$ to $t_2$, a buildup of oscillations takes place and a transient condition exists in the adjustment of frequency from the locked state to the free running state. This transient begins when:

(4) $$|\rho| < \frac{Q_E}{\omega_0}(\omega_1 - \omega')$$

This transient thus begins when oscillations are built up to such level that the synchronizing signal no longer has sufficient power to frequency lock the oscillator 10. Subsequently, the oscillator is so adjusted as to run at its self-sustained free running frequency, $\omega'$.

To achieve pulse-to-pulse coherence then, only the initial and steady-state conditions need be controlled. The initial or phasing interval condition is controlled by the synchronizing signal and the steady-state oscillations by the parameters of the oscillator 10 in combination with the output pulses of the generator 11. It turns out that (1) the ratio of priming power and pre-oscillation noise, (2) the frequency difference between the synchronizing signal output of the oscillator 12 and the high frequency signal output of the magnetron oscillator 10, and (3) the frequency stability during the steady-state condition control the degree of coherence. The synchronizing signal should be at least 10 db above pre-oscillation noise. The frequency difference between the oscillator 10 and the oscillator 12 should be a minimum to obtain a maximum synchronizing gain; that is, to obtain pulse coherence with minimum synchronizing power. The frequency of the synchronizing signal, however, can be substantially varied from the frequency of the signal output of the oscillator 10 provided that the boundary condition imposed by, Equation 2 above, are met. It has been found, for example, that frequency deviations as great as 60 megacycles from a 10,000 kilomegacycle signal output of the oscillator 10 is perfectly compatible. It is preferable, however, that the frequency of the synchronizing signal be less than that of the transmitted signal.

In a coherent-pulsed oscillator actually built and tested, the oscillator comprised a 2J51 magnetron modified to operate at approximately 7,000 volts, the generator 11 utilized a conventional circuit tube to provide output pulses of approximately 7,000 volts, the oscillator 12 utilized a V63 klystron tube, and the coupler 13 a Model 1 Ferrite Duplexer as manufactured by Airtron of Linden, New Jersey, or a Model X-442 circulator as manufactured by Cascade Research Corporation, 53 Victory Lane, Los Gatos, California.

Figure 4:
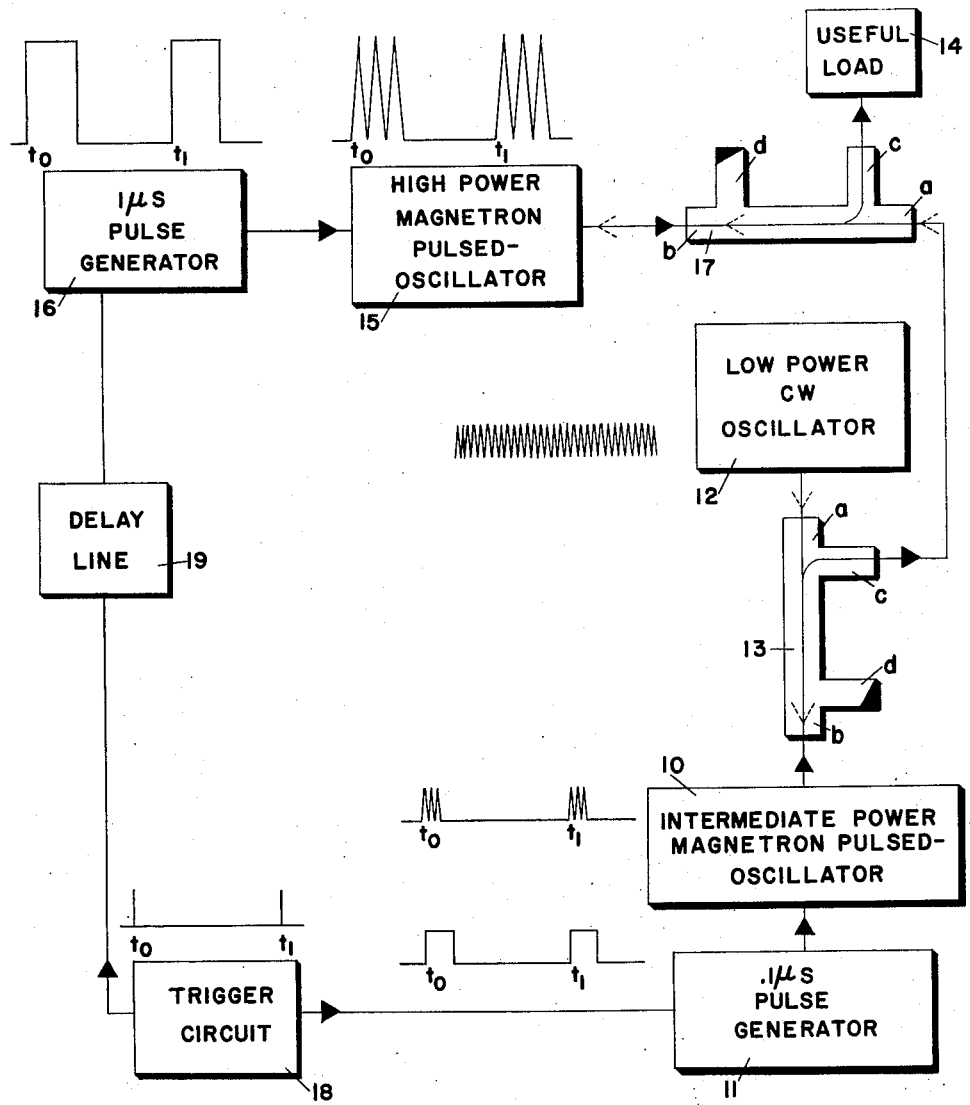
Fig. 4 is a schematic block diagram of a modification of the embodiment in Fig. 1.

*Description and operation of the coherent-pulsed oscillator in Fig. 4*

A modification of the oscillator of Fig. 1 is shown in Fig. 4 in which an additional synchronizing stage is added in cascade to provide substantially higher peak power outputs. The embodiment in Fig. 1 is generally similar to the corresponding portion of the embodiment in Fig. 4. Accordingly, corresponding units are indicated by identical reference numerals. In the coherent-pulsed oscillator of Fig. 4, the output pulses of the oscillator 10 (here termed intermediate power) are coupled to a high power, magnetron pulsed oscillator 15 through a second non-reciprocal, directional coupler 17. As in Fig. 1, the generator 11 is coupled to the oscillator 10. The output of the oscillator 12 is coupled to the branch $a$ of the coupler 13 and the output of the oscillator 10 is coupled to the branch $b$ of the coupler 13. The branch $c$ of the coupler 13 is coupled to the branch $a$ of the coupler 17. The oscillator 15 is coupled to the branch $b$ of the coupler 17 and its branch $c$ is coupled to the load 14. In both couplers 13 and 17 the branches $d$ are each coupled to an absorbent termination as in Fig. 1. The oscillator 15 is coupled to a 1 microsecond pulse generator 16 which operates, for example, at a PRF of 5 kilocycles. A trigger circuit 18, not shown in Fig. 1, is here shown as controlling both the generator 11 and the generator 16. The generator 11, controlling the oscillator 10, provides pulses only 0.1 microsecond long. The triggering pulses from the circuit 18 are coupled through a delay line 19 to the generator 16 to compensate for transmission time effects between the oscillator 10 and the oscillator 15. The delay time required is in the order of .05 to .5 microsecond and determined experimentally.

As noted above with reference to Fig. 3, the synchronizing signal is required during only a relatively short time interval about $t_0$, the time the controlling pulse is applied from the pulse generator. For this reason, the output pulses of the oscillator 10 can be much shorter than those generated by the oscillator 15, for example, 0.1 microsecond as compared with 1.0 microseconds, respectively. The use of a 0.1 microsecond synchronizing pulse for the intermediate power synchronizing signal substantially reduces the average intermediate power required. Thus, in the present embodiment, the generator 16 supplies a 0.1 microsecond pulse to the high power oscillator 15. The cascading of synchronizing signals in the manner of the embodiment of Fig. 4 is highly desirable when extraordinarily high power requirements exist. In this embodiment, for example, the peak power output of the oscillator 15 is in the order of megawatts, requiring an intermediate peak power synchronizing signal from the oscillator 10 in the order of kilowatts (at a very low average power duty cycle), which in turn required a low power, continuous wave, synchronizing signal from the oscillator 12 in the order of watts. By using a narrow intermediate power pulse, the average power required from the oscillator 10 can be as low as 50 db below the average power output of the oscillator 15.

*Description and operation of the non-reciprocal coupler in Fig. 5*

Referring now to Fig. 5, there is here presented a directional coupler of the type utilized in the embodiments of Figs. 1 and 4. The coupler comprises a plurality of rectangular waveguide branch arms 20, 21, 22 and 23, also referenced $a$, $c$, $d$, and $b$, respectively, to correspond with Figs. 1 and 4. The center portion of the coupler includes a square waveguide section 24. Centrally located within the guide 24 is a tapered ferrite rod 25 axially oriented as shown. A magnetic coil 26 surrounds the waveguide 24 in the vicinity of the rod 25. Direct current is so applied to the coil 26 as to provide a magnetic flux in the direction indicated by an arrow 27. Dashed-line-arrows 28 indicate the direction of the E-plane of the waveguides 20—23. The guide 20, as shown, is so oriented that its E-plane is vertical; relative thereto, the E-plane of the guide 21 is perpendicular, the E-plane of the guide 22 is at an angle of +45°, and the E-plane of the guide 23 is oriented at −45°. The outline-arrows 29 characterize the orientation of the E-vector of incident plane-polarized electromagnetic energy traveling from the branch $a$ to the branch $b$. The heavy-black-arrows 30 characterize the E-vector orientation of energy traveling from the branch $b$ to the branch $c$.

As noted above, the coupler illustrated in Fig. 5 utilizes the microwave Faraday effect in which the plane of polarization of incident energy is rotated by passing through an axially oriented magnetic field. This principle is combined with well-known waveguide principles in determining the propagation paths of electromagnetic energy in the coupler. Rectangular waveguide is conventionally so dimensioned as to provide a boundary defining dimension for the E-plane of plane-polarized energy greater than a half wave length at the operating frequency and longer than the dimension parallel to the E-plane vector. In particular, the shorter dimension is characterized by the E-plane vector and is chosen to be below cut-off or less thna a half wave length at the operating frequency. If the E-vector of incident energy is parallel to the E-plane vector of the guide, the energy is propagated by the guide; if the two vectors are orthogonally oriented, the energy is reflected. In the coupler shown in Fig. 5, the Faraday rotation is provided by the ferrite rod 25 through which a magnetic field is axially directed by passing a direct current through the coil 26. Energy entering the branch $a$ is vertically polarized as shown by the outline-arrow 29. In this embodiment, when the energy passes through the ferrite rod 25, it is rotated counter-clockwise 45°. Since the E-vector of the energy is then colinear with the E-plane vector of the branch $b$, the energy is transmitted through the branch $b$. Energy entering the branch $b$ is initially characterized by an E-vector oriented at −45° as indicated by the heavy-black-arrow 30. When this energy passes through the ferrite rod 25 it is rotated, in the direction indicated by the arrow 31, −45°. The E-vector of this energy is then orthogonally oriented relative to the E-plane vector of the branch $a$ and reflected by that branch. The coupler is thus a non-reciprocal device.

Referring now to Fig. 6, the diagrams (a) through (e) illustrate the angular orientations of the E-vector of energy traveling from the branch $a$ to the branch $b$ and the E-planes of the various branch guides. The diagrams (f) through (j) illustrate the angular orientations of the E-vector of energy traveling from the branch $b$ to the branch $c$ and the E-planes of the various branch guides.

Considering first energy traveling from the branch $a$ to the branch $b$, at the branch $a$ the E-plane vector of the guide 20 is colinear with the E-vector of the incident energy at that branch as shown in Fig. 6(a), thereby accepting and transmitting the energy. At the branch $c$ the E-vector is perpendicular to the E-plane vector of the guide 21 as shown in Fig. 6(b); hence, the energy is reflected by the branch $c$. In Fig. 6(c) the E-vector of the incident energy is shown rotated 45° counter-clockwise in the direction indicated by the circular arrow 31. As apparent from the above-referenced Hogan article, the degree of rotation is a function of the type and length of the ferrite rod 25 as well as the strength of the axial magnetic field supplied by the coil 26. At the branch $d$ the energy is reflected since the E-vector is again orthogonal to the E-plane of the guide 22 and at the branch $b$, transmitted, since the two vectors are colinear, as shown, respectively, by the diagrams (d) and (e) of Fig. 6.

Similarly, for energy traveling from the branch $b$ to the branch $c$, as shown respectively in the diagrams 6(f) through 6(j), the E-vector is colinear with the E-plane vector 28 of the guide $b$, perpendicular to the E-plane vector 28 of the guide $d$, rotated 45° counter-clockwise, colinear with the E-plane of the guide $c$, and perpendicular to the E-plane of the guide $a$.

Since the short dimension of the branch guides $a$–$d$ is chosen to be below cutoff at the operating frequency, for example .5 inch at 10 kilomegacycles, when the E-vector of incident energy is perpendicular to the E-plane of the guide, the energy is reflected. It will be apparent, from the discussion above, that energy directed from the branch $a$ to the branch $b$ cannot be transmitted in the branches $c$ and $d$. Similarly, energy directed from the branch $b$ to the branch $c$ is reflected by the branches $a$ and $d$. The coupler thus can be used to so couple the synchronizing means, the oscillator means, and the load means embodied in Figs. 1 and 4 as to cause substantially all of the energy in the synchronizing signals to be directed to the oscillator means and substantially all of the energy in the signal output of the oscillator means to be translated to the load means. In practice the isolation between the various branches is, of course, finite, being of the order of −20 to −50 db. As a consequence, reflections within the guide 24 of the coupler are generated. For this reason an absorptive load is connected to the branch $d$ to dissipate reflected energy. For the sake of greater clarity the structure illustrated in Fig. 5 is greatly simplified relative to a practical guide. The branch guides, for example, are typically tapered to provide a suitable impedance match between the branch guides and the central section of the coupler. Likewise, it is normal to twist the guide 23 45° to provide colinear inputs and outputs.

While the embodiments above have been described with particular reference to a magnetron oscillator, it will be apparent that other devices utilizing resonant cavities may be substituted for the magnetron; thus, for example, a klystron or carcinotron may be used in place of the magnetron.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A coherent-pulsed oscillator, comprising: oscillator means to generate a high frequency signal; pulse generating means coupled to said oscillator means to cause it to oscillate during predetermined time intervals recurring in a predetermined pattern; synchronizing means to provide a synchronizing signal; a load means; and non-reciprocal directional coupling means for coupling energy from said synchronizing means only to said oscillator means and from said oscillator means only to said load means, thereby, to cause substantially all of the energy in said high frequency signal to be translated to said load means and substantially all of the energy in said synchronizing signal to be translated to said oscillator means to prime said oscillator means and establish pulse-to-pulse phase coherence between pulses of energy generated by said oscillator means.

2. A coherent-pulsed oscillator, comprising: oscillator means including a resonant cavity to generate a high frequency signal; pulse generating means coupled to said oscillator means to cause it to oscillate during predeterminal time intervals recurring in a predetermined pattern; synchronizing means to provide a continuous wave synchronizing signal; a load means; and non-reciprocal directional coupling means for coupling energy from said synchronizing means only to said oscillator means and from said oscillator means only to said load means, thereby to cause substantially all of the energy in said high frequency signal to be translated to said load means and substantially all of the energy in said synchronizing signal to be translated to said oscillator means to prime said oscillator means and establish pulse-to-pulse phase coherence between pulses of energy generated by said oscillator means.

3. A coherent-pulsed oscillator, comprising: a magnetron oscillator including a resonant cavity to generate a high frequency signal; pulse generating means coupled to said magnetron to cause it to oscillate during predetermined time intervals recurring in a predetermined pattern; synchronizing means to provide a continuous wave, synchronizing signal substantially at the frequency of said high frequency signal; a load means; and non-reciprocal directional coupling means for coupling energy from said synchronizing means only to said oscillator means and from said oscillator means only to said load means, thereby, to cause substantially all of the energy in said high frequency signal to be translated to said load means and substantially all of the energy in said synchronizing signal to be translated to said oscillator means to prime said oscillator means and establish pulse-to-pulse phase coherence between pulses of energy generated by said oscillator means.

4. A coherent-pulsed oscillator, comprising: oscillator means including a resonant cavity to generate a high frequency signal; pulse generating means coupled to said oscillator means to cause it to oscillate during predetermined time intervals recurring in a predetermined pattern; synchronizing means to provide a continuous wave, synchronizing signal; a load means; and a non-reciprocal, ferrite gyrator for coupling energy from said synchronizing means only to said oscillator means and from said oscillator means only to said load means, thereby, to cause substantially all of the energy in said high frequency signal to be translated to said load means and substantially all of the energy in said synchronizing signal to be translated to said oscillator means to prime said oscillator means and establish pulse-to-pulse phase coherence between pulses of energy generated by said oscillator means.

5. A coherent-pulsed oscillator, comprising: oscillator means including a resonant cavity to generate a high frequency signal; pulse generating means coupled to said oscillator means to cause it to oscillate during predetermined time intervals recurring in a predetermined pattern; a klystron to provide a continuous wave, synchronizing signal substantially at the frequency of said high frequency signal; a load means; and non-reciprocal directional coupling means for coupling said synchronizing means only to said oscillator means and from said oscillator means only to said load means, thereby, to cause a substantially all of the energy in said high frequency signal to be translated to said load means and substantially all of the energy in said synchronizing signal to be translated to said oscillator means to prime said oscillator means and establish pulse-to-pulse phase coherence between pulses of energy generated by said oscillator means.

6. A coherent-pulsed oscillator, comprising: an oscillator means including a resonant cavity to generate a high power high frequency signal; intermediate synchronizing means to generate an intermediate power, pulsed synchronizing signal; pulsed generating means coupled to said oscillator means and said intermediate means to cause them to oscillate during predetermined time interdirection coupling means coupled to said low-power, synchronizing means to generate a low power, continuous wave, synchronizing signal; a load means; low power, non-reciprocal, directional coupling means for coupling energy from said low power means only to said intermediate power means and from said intermediate power means only to said oscillator means, thereby to enable substantially all of the energy in said low power signal to be translated to said intermediate power synchronizing means and substantially all of the energy in said intermediate power synchronizing signal to be translated to said oscillator means to prime said intermediate power means and establish pulse-to-pulse phase coherence between pulses of energy generated by said intermediate power means; pulse synchronizing means coupled to said intermediate power means and said pulse generating means to synchronize pulsing of said intermediate power and oscillator means; and high power, non-reciprocal, directional coupling means coupled to said low-power, directional coupling means for coupling energy from said intermediate means only to said oscillator means and from said oscillator means only to said load means, thereby, to cause substantially all of the energy in said intermediate power signal to be translated to said oscillator means and substantially all of the energy in said high power signal to be translated to said load means to establish pulse-to-pulse phase coherence between pulses of energy generated by said oscillator means.

7. A coherent-pulsed oscillator, comprising: oscillator means to generate a high frequency signal; pulse generating means coupled to said oscillator means to cause it to oscillate during predetermined time intervals recurring in a predetermined pattern; synchronizing means to provide a synchronizing signal; a load means; a ferromagnetic, non-reciprocal, directional, coupling means having at least three terminals, each coupled to one of said oscillator means, said synchronizing means and said load means, respectively, said directional coupling means having a transmission line section, a ferromagnetic medium disposed within said transmission line section and a unidirectional bias magnetic field axially directed through said ferromagnetic medium to provide a predetermined rotation of the plane of polarization of energy passing through said ferromagnetic medium for coupling energy from said synchronizing means only to said oscillator means and from said oscillator means only to said load means, thereby, to cause substantially all of the energy in said high frequency signal to be translated to said load means and substantially all of the energy in said synchronizing signal to be translated to said oscillator means to prime said oscillator means and establish pulse-to-pulse phase coherence between pulses of energy generated by said oscillator means.

References Cited in the file of this patent

UNITED STATES PATENTS

| | | |
|---|---|---|
| 2,409,038 | Hansell | Oct. 8, 1946 |
| 2,656,112 | Alter et al. | Aug. 21, 1951 |
| 2,748,353 | Hogan | May 29, 1956 |
| 2,759,099 | Olive | Aug. 14, 1956 |